United States Patent
Choi et al.

(10) Patent No.: US 9,210,188 B2
(45) Date of Patent: Dec. 8, 2015

(54) METHOD FOR PREVENTING RELAY-ATTACK ON SMART KEY SYSTEM

(71) Applicant: DAE DONG CO., LTD., Ansan-si, Gyeonggi-do (KR)

(72) Inventors: Sang Kyu Choi, Gunpo-si (KR); Shim Soo Kim, Ansan-si (KR); Gyu Ho Kim, Ansan-si (KR)

(73) Assignee: DAE DONG CO., LTD., Ansan-si (KR)

( * ) Notice: Subject to any disclaimer, the term of this patent is extended or adjusted under 35 U.S.C. 154(b) by 0 days.

(21) Appl. No.: 14/395,022

(22) PCT Filed: Oct. 25, 2012

(86) PCT No.: PCT/KR2012/008819
§ 371 (c)(1),
(2) Date: Oct. 16, 2014

(87) PCT Pub. No.: WO2013/157709
PCT Pub. Date: Oct. 24, 2013

(65) Prior Publication Data
US 2015/0074805 A1    Mar. 12, 2015

(30) Foreign Application Priority Data

Apr. 17, 2012  (KR) .................. 10-2012-0039826
Apr. 17, 2012  (KR) .................. 10-2012-0039827
Apr. 17, 2012  (KR) .................. 10-2012-0039828
Apr. 17, 2012  (KR) .................. 10-2012-0039829

(51) Int. Cl.
*H04L 29/06*    (2006.01)
*B60R 25/24*    (2013.01)
*H04W 4/00*    (2009.01)
*H04W 12/08*    (2009.01)

(52) U.S. Cl.
CPC ............ *H04L 63/1466* (2013.01); *B60R 25/24* (2013.01); *H04L 63/0853* (2013.01); *H04W 4/008* (2013.01); *H04W 12/08* (2013.01)

(58) Field of Classification Search
CPC .. H04W 4/008; H04W 12/08; H04L 63/1466; H04L 63/0853; B60R 25/24
USPC ................. 726/22; 701/2, 36, 468; 340/12.22
See application file for complete search history.

(56) References Cited

U.S. PATENT DOCUMENTS

| 5,724,028 | A | * | 3/1998 | Prokup ........................... 701/36 |
| 5,927,240 | A | * | 7/1999 | Maxon ......................... 123/179.3 |
| 2003/0227550 | A1 | * | 12/2003 | Manico et al. ............ 348/207.99 |

(Continued)

FOREIGN PATENT DOCUMENTS

| JP | 2005-29990 A | 2/2005 |
| JP | 2008-127887 A | 6/2008 |

(Continued)

*Primary Examiner* — Haresh N Patel
(74) *Attorney, Agent, or Firm* — Birch, Stewart, Kolasch & Birch, LLP (57) ABSTRACT

The present invention relates to a method for preventing a relay-attack on a smart key system, and in particular, provides an advantage of preventing a vehicle and equipment stored inside the vehicle from being stolen by using predetermined information transmitted and received when the SMK UNIT of the vehicle and a FOB Key wirelessly communicate with each other and enabling a holder of the FOB Key to make the relay-attack once the holder secures visibility from the vehicle.

6 Claims, 9 Drawing Sheets

(56) References Cited

U.S. PATENT DOCUMENTS

| | | | |
|---|---|---|---|
| 2004/0006426 A1* | 1/2004 | Armstrong et al. | 701/213 |
| 2005/0195292 A1* | 9/2005 | McIntyre et al. | 348/231.6 |
| 2008/0079602 A1* | 4/2008 | King et al. | 340/825.69 |
| 2008/0079603 A1* | 4/2008 | King et al. | 340/825.69 |
| 2009/0243791 A1* | 10/2009 | Partin et al. | 340/5.2 |
| 2010/0305779 A1* | 12/2010 | Hassan et al. | 701/2 |
| 2011/0187498 A1* | 8/2011 | Flaherty et al. | 340/5.72 |

FOREIGN PATENT DOCUMENTS

| | | |
|---|---|---|
| JP | 2008-240315 A | 10/2008 |
| JP | 2010-121297 A | 6/2010 |

* cited by examiner

| No. | VL | RSSI | distance determination | final determination |
|---|---|---|---|---|
| 1 | 3V | not less than set strength | Near | allowed |
| 2 | 3V | less than set strength | Far | rejected |
| 3 | 2V | not less than set strength | Near | allowed |
| 4 | 2V | less than set strength | Far | rejected |

METHOD FOR PREVENTING RELAY-ATTACK ON SMART KEY SYSTEM

TECHNICAL FIELD

The present invention relates to a method for preventing relay-attach on a smart key system, and more specifically, to a method for preventing relay-attack on a smart key system that may prevent a vehicle from being stolen by someone else by delivering an LF signal from the vehicle to a FOB key carried by a user even when the user is located far away from the vehicle at a predetermined distance or more so that the user cannot realize the vehicle (hereinafter, this situation is referred to as "relay-attack").

BACKGROUND ART

In general, a smart key system for vehicles refers to a system in which a driver (or user) carries a FOB key, and a smart key unit of the vehicle (hereinafter, "SMK unit") analyzes an encrypted code from the FOB key to operate various functional operation units of the vehicle only when the user is authenticated as a normal user, thus preventing the vehicle from being stolen.

That is, if the user carrying the FOB key approaches the vehicle within a predetermined distance, the SMK unit wakes up the FOB key and communicates encryption code data of a transponder embedded in the FOB key to authenticate a normal user ID, and if the user is determined as a normal user, the SMK unit switches on so that various functional operation units installed in the vehicle, such as starting engine, opening/closing the trunk door or side doors, may be in normal operation.

Meanwhile, a signal transfer system when a side door is opened, may be divided into the following two situations: In the first situation, after normal user ID authentication is done, among operation switches of various functional operation units provided in the FOB key, a switch associated with the operation of the side door is directly entered by the user so that a predetermined signal is transmitted to the SMK unit. In the second situation, the normal user ID is authenticated, and then, a triggering signal generated from the handle of the side door is transmitted to the SMK unit.

The triggering signal generated from the handle of the side door may be generated as the user himself pulls the handle of the side door or as the user presses a triggering button provided on the handle of the side door.

A normal user ID authentication process performed between the spraying unit and the FOB key in the conventional smart key system is briefly described below.

First, if the FOB key approaches the vehicle within a predetermined distance or the user himself pulls the handle of the side door, a challenge signal is generated, and the generated challenge signal is modulated or demodulated by the SMK unit, and is then received by an LF receiver of the FOB key. Upon receiving the challenge signal, the FOB key transmits a response signal including an ID code and encryption code by way of an RF transmitter of the FOB key. The RF receiver of the SMK unit receives the response signal, determines whether the received ID code and encryption code match previously stored ID code and encryption code, and only when they match, enables the operation of the functional operation units.

In the conventional smart key system, however, even when the user carrying the FOB key is located away from the vehicle at a predetermined distance or more (for example, the maximum visibility range within which the driver may observe the vehicle), in case a challenge signal is normally transferred from the vehicle to the FOB key (this is referred to as "relay-attack"), the various functional operation units may remain operated by someone else, thus causing the vehicle and equipment in the vehicle to be stolen.

Further, the conventional smart key system cannot recognize a FOB key with copied encryption code data, thus oftentimes putting the vehicle or equipment in high chance of being stolen by a person who carries a copied FOB key with an impure intention.

SUMMARY

Objects

The present invention has been designed to solve the above problems, and an object of the present invention is to provide a method for preventing relay-attack on a smart key system that may identify a proper user of a FOB key by using information transmitted/received upon transmission and reception between the SMK unit and FOB key of the vehicle and that enables the functional operation units to be operated in such a situation where a normal user carrying a FOB key secures visibility from the vehicle to prevent the vehicle and equipment in the vehicle from being stolen.

Solutions

According to an embodiment of the present invention, a method for preventing relay-attack on a smart key system comprises: a challenge signal receiving step of transmitting a challenge signal including received signal strength information (hereinafter, "RSSI") information of two levels from a smart key unit (hereinafter, "SMK unit") installed in a vehicle to a FOB key carried by a user and receiving the challenge signal by the FOB key; a first decoding step of decoding at least one information item of information items included in the challenge signal after receiving the challenge signal; a response signal transmitting step of transmitting a response signal from the FOB key to the SMK unit after the first decoding step; a second decoding step of decoding at least any one information item included in the response signal received by the SMK unit after the response signal transmitting step; and a normal user determining step of calculating a current distance between the vehicle and the FOB key using a result interpreted in the second decoding step and determining whether a passive operation signal applied from a door of the vehicle other than the FOB key is normal.

According to another embodiment of the present invention, a method for preventing relay-attack on a smart key system comprises: a challenge signal receiving step of transmitting a modulated/demodulated challenge signal by an SMK unit in a vehicle when a predetermined electrical signal is input to the SMK unit and then receiving the challenge signal by a FOB key; and a response signal receiving step of the FOB key transmitting to the SMK unit a response signal including predetermined information at a predetermined output strength in response to the challenge signal of the SMK unit after the challenge signal receiving step and the SMK unit receiving the response signal, wherein the response signal transmitting step includes a signal determining process determining whether the challenge signal is an LF signal input to the SMK unit by door handle triggering or an RF signal input to the SMK unit by manipulating a plurality of switches provided on the FOB key, the response signal transmitting step being a step of performing control so that an output strength of the response signal varies depending on the input signal.

According to still another embodiment of the present invention, a method for preventing relay-attack on a smart key system comprises: a response signal transmitting step of a FOB key carried by a user receiving a signal applied from an SMK unit installed in a vehicle and then transmitting a response signal including at least two types of information to the SMK unit; a second decoding step of the SMK unit decoding the received response signal after the response signal transmitting step; and a normal user determining step of calculating a current distance between the vehicle and the FOB key using a result interpreted in the second decoding step and determining whether a passive operation signal applied from a door of the vehicle other than the FOB key is normal, wherein the response signal includes information on a received signal strength indication (hereinafter, "RSSI") and a current voltage level (hereinafter, "VL") of the FOB key.

Effects

According to the present invention, a method for preventing relay-attack on a smart key system allows for passive entry and passive start while a normal carrier of a FOB key actually secures visibility to a vehicle, thus preventing the vehicle and equipment in the vehicle from being stolen.

DESCRIPTION OF EXEMPLARY EMBODIMENTS

Hereinafter, preferred embodiments of a method for preventing relay-attack on a smart key system according to the present invention will be described in detail with reference to the accompanying drawings.

Figure 1:
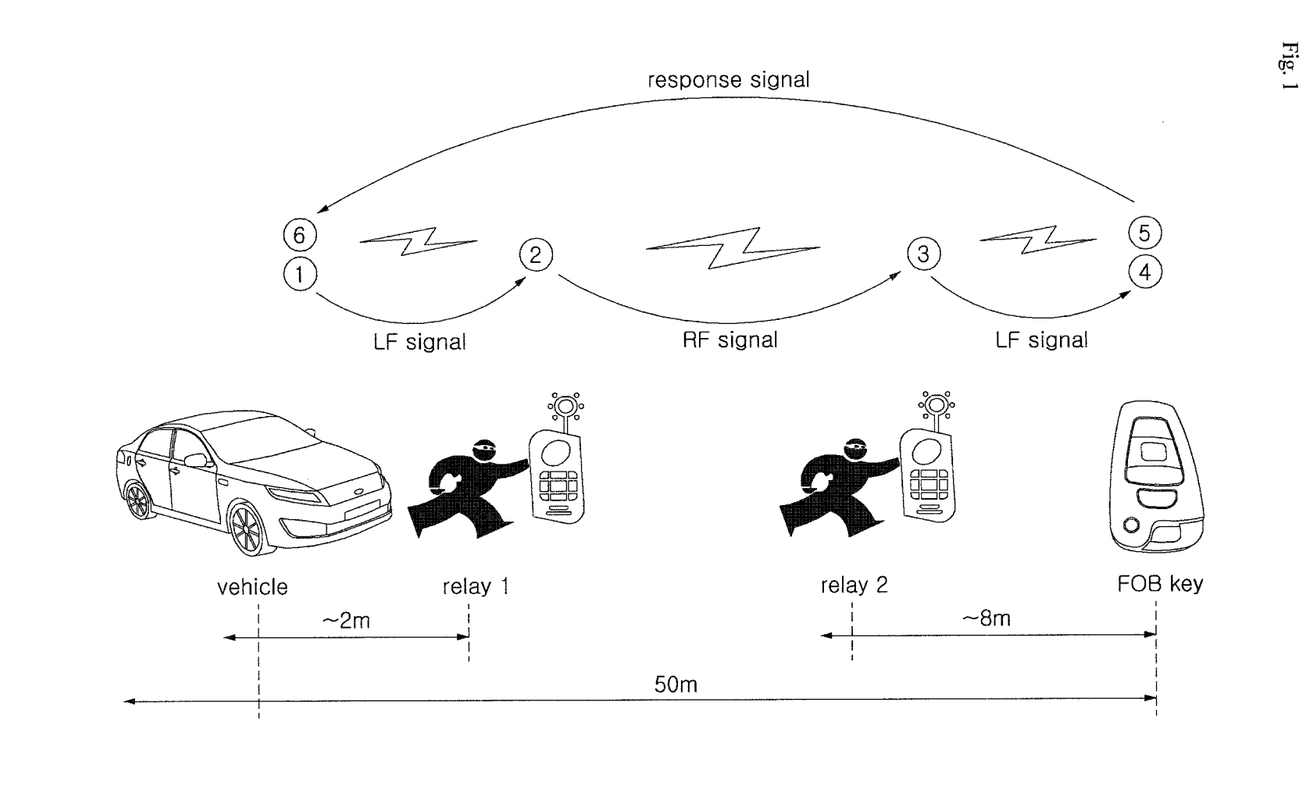
FIG. 1 is a view schematically illustrating a state in which passive entry is possible between a FOB key and a SMK unit when door handle triggering is in operation.
Figure 2:
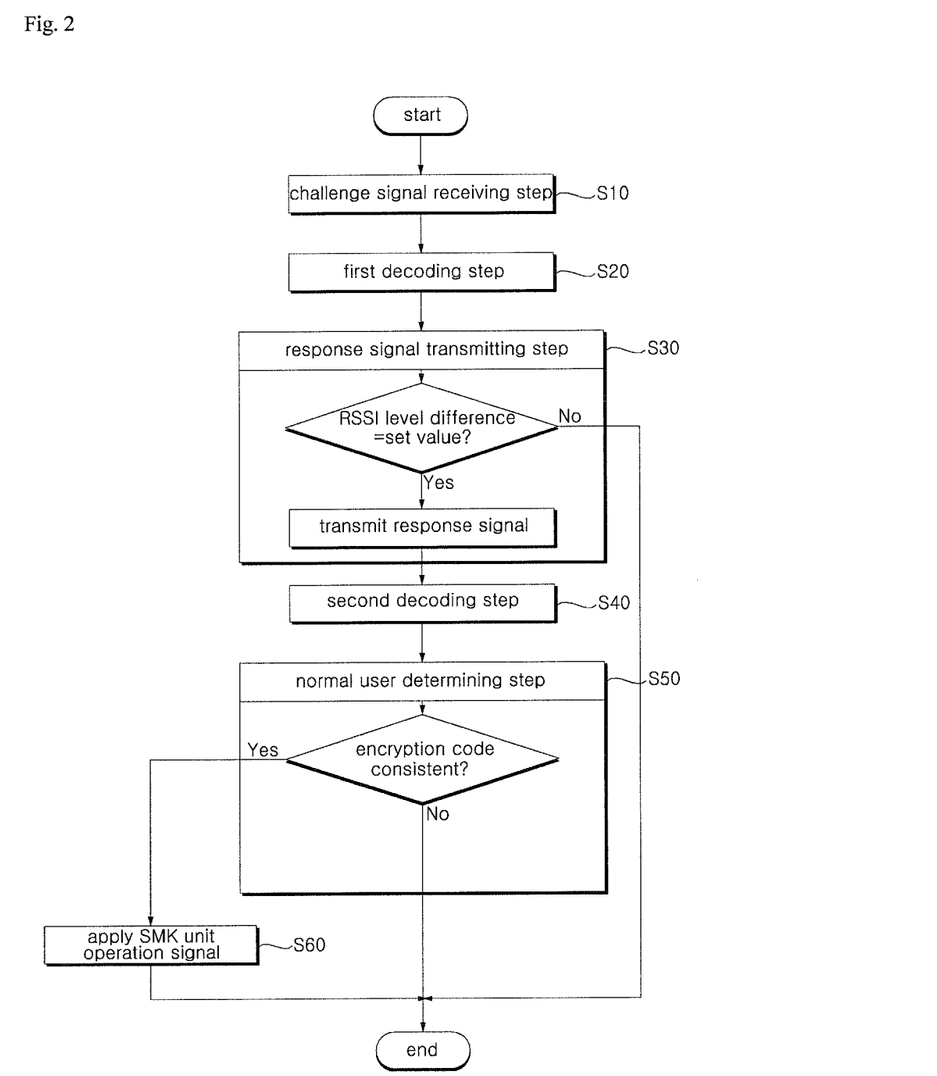
FIG. 2 is a block diagram illustrating an operation process of a method for preventing relay-attack on a smart key system according to a first embodiment of the present invention.
Figure 3:
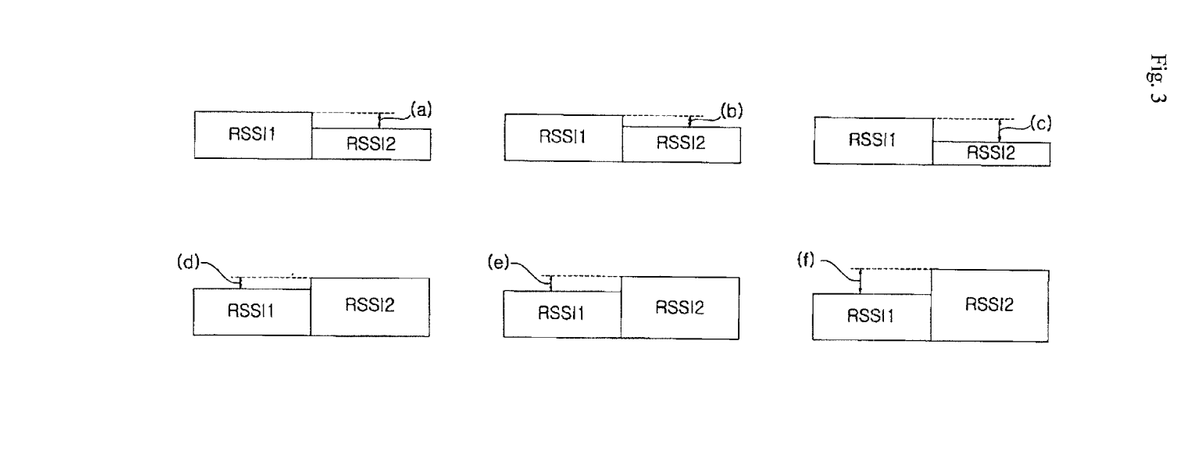
FIG. 3 is a concept view illustrating a difference in level of RSSI generated by a method for preventing relay-attack on a smart key system according to the present invention.
Figure 4A:
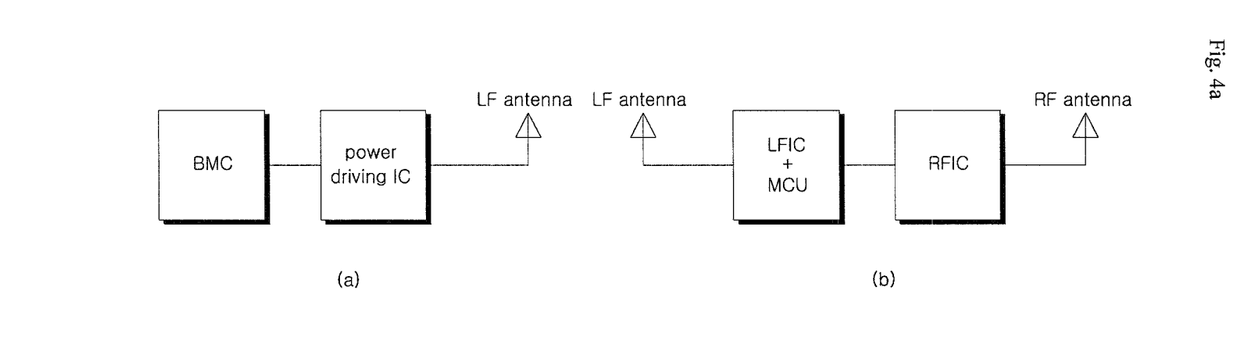
FIGS. 4a and 4b are views schematically illustrating configurations of a vehicle and a FOB key where a method for preventing relay-attack on a smart key system according to the present invention is implemented.
Figure 4B:
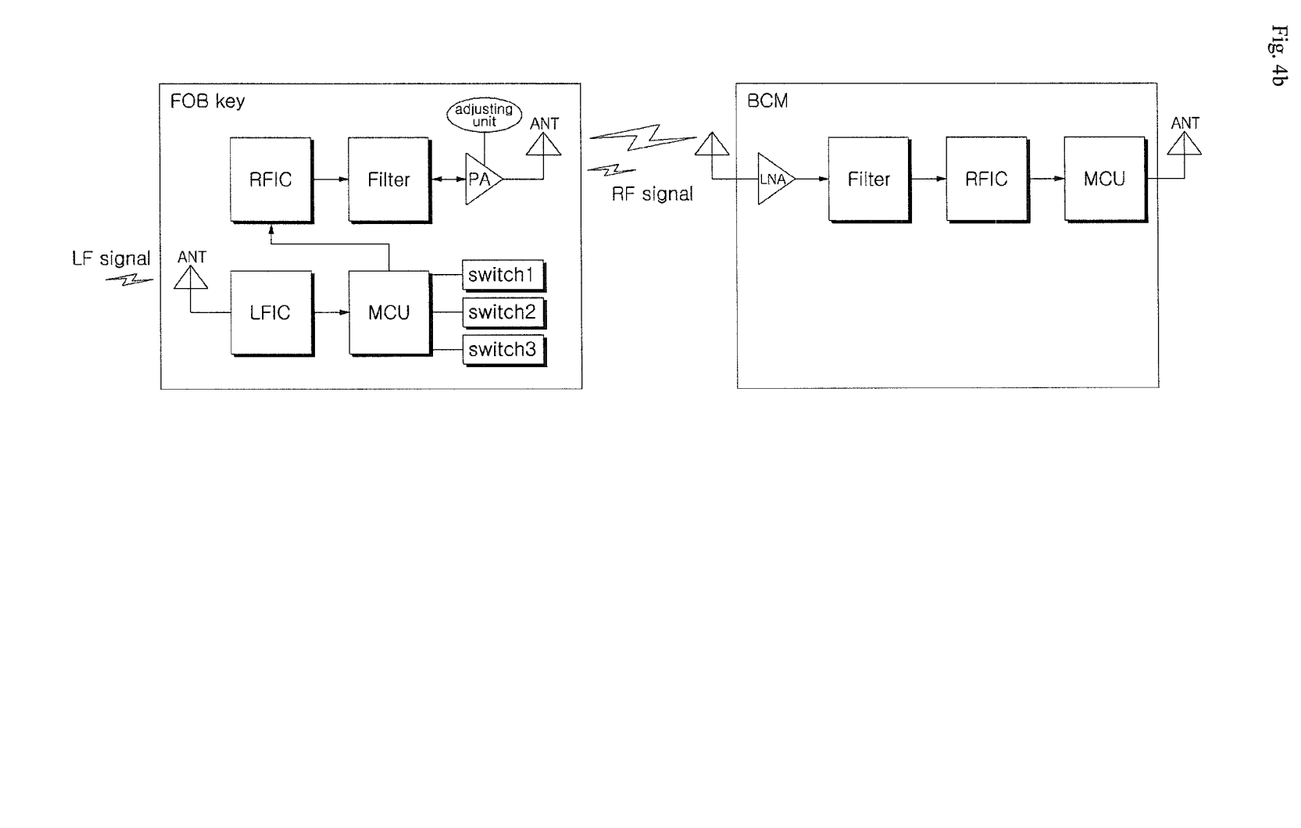
Figure 5:
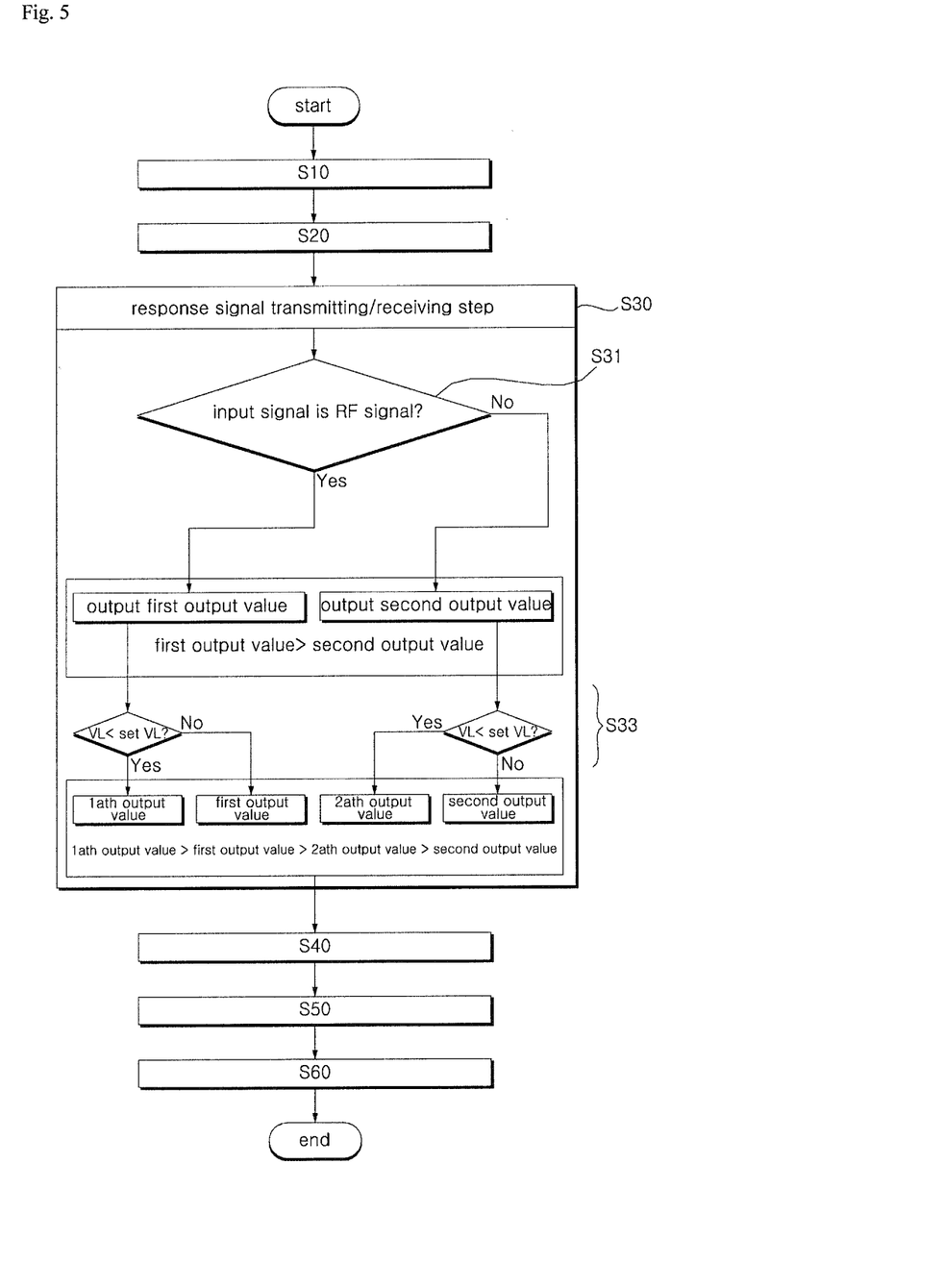
FIG. 5 is a block diagram illustrating an operation process of a method for preventing relay-attack on a smart key system according to a second embodiment of the present invention.
Figure 6:
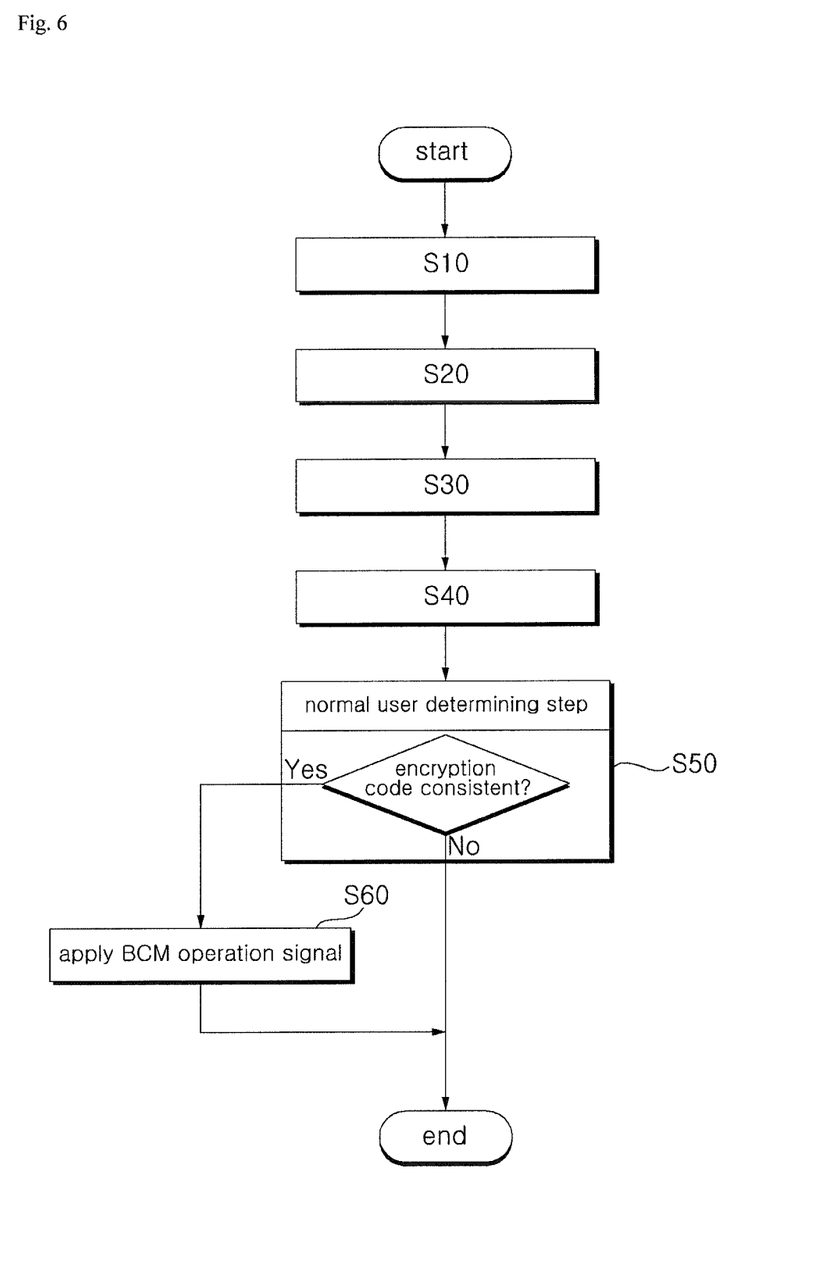
FIG. 6 is a block diagram illustrating an operation process of a method for preventing relay-attack on a smart key system according to a third embodiment of the present invention.
Figure 7:
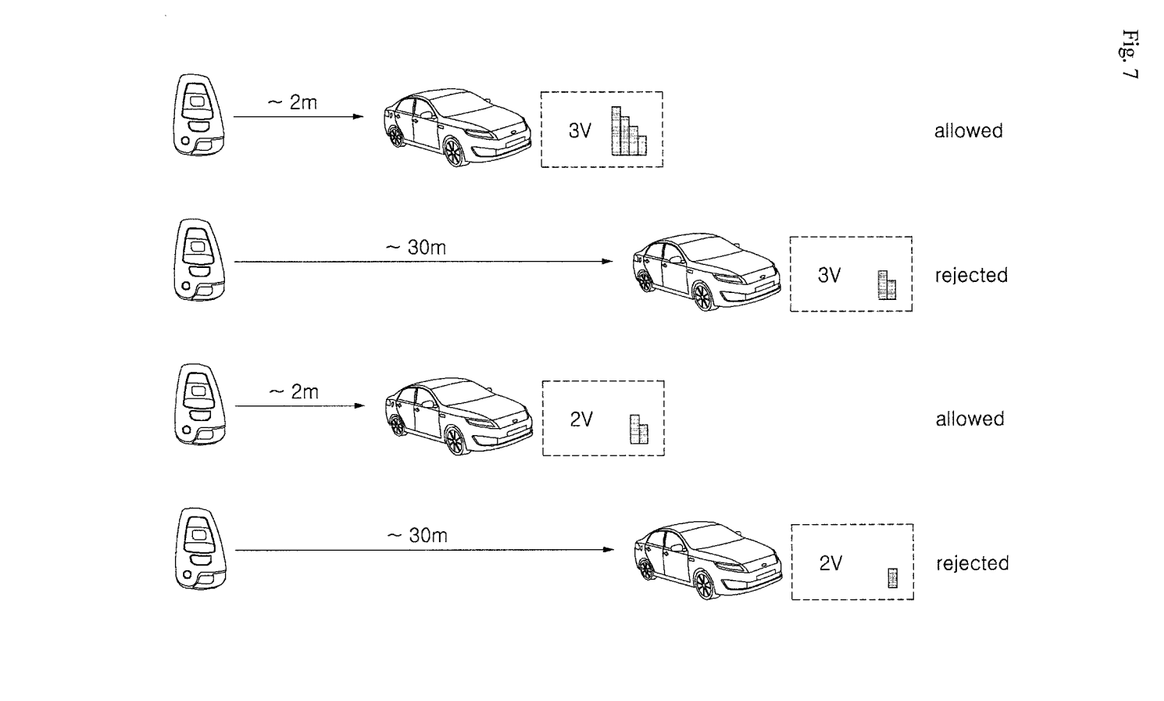
FIG. 7 is a view schematically illustrating an operation state of FIG. 6.
Figure 8:
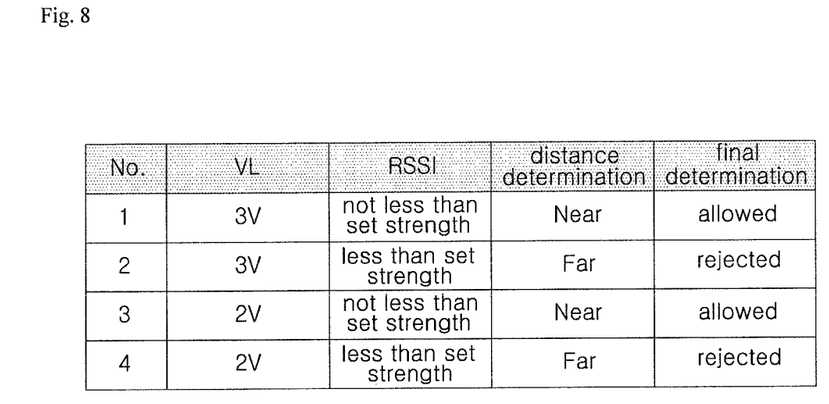
FIG. 8 is an example table of map data stored in a SMK unit.

FIG. 1 is a view schematically illustrating a state in which passive entry is possible between a FOB key and a SMK unit when door handle triggering is in operation. FIG. 2 is a block diagram illustrating an operation process of a method for preventing relay-attack on a smart key system according to a first embodiment of the present invention. FIG. 3 is a concept view illustrating a difference in level of RSSI generated by a method for preventing relay-attack on a smart key system according to the present invention. FIGS. 4a and 4b are views schematically illustrating configurations of a vehicle and a FOB key where a method for preventing relay-attack on a smart key system according to the present invention is implemented. FIG. 5 is a block diagram illustrating an operation process of a method for preventing relay-attack on a smart key system according to a second embodiment of the present invention. FIG. 6 is a block diagram illustrating an operation process of a method for preventing relay-attack on a smart key system according to a third embodiment of the present invention. FIG. 7 is a view schematically illustrating an operation state of FIG. 6. FIG. 8 is an example table of map data stored in a SMK unit.

The vehicle to which a method for preventing relay-attack on a smart key system according to the present invention applies include a smart key unit (hereinafter, "SMK unit") for controlling the operation of various functional operation units installed in the vehicle body according to various electrical signals applied as switches provided in the vehicle body are manipulated or as a portable terminal is manipulated.

The SMK unit plays a role to control the operation of various functional operation units such as engine, transmission and air-conditioning parts installed in the vehicle body.

According to the present invention, the method for preventing relay-attack on a smart key system is motivated by a communication method between the vehicle equipped with the SMK unit and a FOB key that is formed small enough for a driver (or user) to carry and that communicates with the SMK unit by a wireless communication method. The FOB key is a sort of the above-mentioned portable terminal.

A communication method of the smart key system is briefly described. If the user pulls the handle of a side door provided in the vehicle body (hereinafter, referred to as "door handle triggering") or manipulates any one of a plurality of switches provided in the FOB key, an LF signal, a predetermined electrical signal, is generated, and the generated LF signal is modulated/demodulated and is then transmitted to the FOB key. The FOB key transmits a response signal to the SMK unit in response to the LF signal. The SMK unit analyzes (decodes) the encryption code and various pieces of information contained in the response signal and then determines whether they match data associated with a previously stored encryption code to determine whether the user carrying the FOB key is a normal user.

The case where such communication method of the smart key system, as is, applies to when the distance between the SMK unit and the FOB key is within a limited range in which the SMK unit and the FOB key may communicate with each other thereby to be able to authenticate being a normal user. Typically, as long as the distance remains within the limited range, the SMK unit may determine that the user is a normal one, and thus, the various functional operation units of the vehicle are in operatable situation even to a third party not carrying the FOB key. In this case, the limited range is preferably set as a visibility range within which the carrier of the FOB key may observe the vehicle. However, what matters is that the limited range is previously set to the SMK unit, and in some cases, the range may be expanded to a range where the carrier of the FOB key cannot observe the vehicle.

In other words, as shown in FIG. 1, the LF signal generated by the door handle triggering is delivered to two or more repeaters (repeaters 1 and 2) positioned between the SMK unit and the FOB key, and the FOB key transmits the response signal to enable the third party to do passive entry and passive start by the door handle triggering even when the FOB key is located away from the vehicle at the visibility range or more (this situation is typically referred to as "relay-attack on smart key system"). For example, the distance in which the repeater 1 may receive the LF signal generated by the door handle triggering and modulate the received LF signal is short, 2 m or less, and the distance in which the FOB key may receive the LF signal demodulated by the repeater 2 is short, 8 m or less. However, the distance in which the modulated RF1 signal may be communicated through the two repeaters is relatively large, and the distance in which the SMK unit may receive the response signal transmitted from the FOB key is relatively large (about 50 m or less). Accordingly, the carrier of the FOB key may depart from the visibility range in which he may observe the vehicle when the door handle triggering occurs.

The present invention has been designed to address the above issues and to previously cut off the possibility of the vehicle and equipment in the vehicle being stolen by allowing the normal user authentication process to be performed only when the carrier of the FOB key is located within the visibility range in which he may directly observe the vehicle with his eyes based on the information contained when the SMK unit and the FOB key exchange information in a wireless communication manner.

Particularly in an embodiment of a method for preventing relay-attack on a smart key system according to the present invention, it is determined whether the FOB key receiving the challenge signal is carried by a proper user, and once the response signal is transmitted from the FOB key, the SMK unit performs a procedure for authenticating a normal user.

An embodiment of a method for preventing relay-attack on a smart key system according to the present invention, as shown in FIG. 2, includes a challenge signal receiving step (S10) in which upon door handle triggering of the vehicle, the smart key unit (hereinafter, "SMK unit") installed in the vehicle transmits a challenge signal containing two levels of received signal strength indication (hereinafter, "RSSI") information to a FOB key and the FOB key receives the challenge signal, a first decoding step (S20) in which the FOB key decodes a difference in level of the RSSIs of the received challenge signal, a response signal transmitting step (S30) in which only when the difference in level of the RSSIs interpreted in the first decoding step (S20) is consistent with a set value, the FOB key transmits a response signal to the SMK unit in response to the challenge signal, a second decoding step (S40) in which the SMK unit decodes the received response signal, and a normal user determining step (S50) in which a current distance between the vehicle and the FOB key is calculated using a result interpreted in the second decoding step (S40), and it is determined whether a passive operation signal applied from a door of the vehicle other than the FOB key is normal.

Here, the challenge signal receiving step (S10) through the response signal transmitting step (S30) may be considered to be the step of determining whether the carrier of the FOB key carries a proper FOB key before the FOB key sends the response signal, as described above, and the response signal transmitting step (S30) through the normal user determining step may be considered to be the step of enabling relay-attack only when the carrier of the FOB key secures visibility to the vehicle by precisely calculating the current distance between the vehicle and the FOB key as described above.

Hereinafter, for ease of description, the step of determining whether the carrier of the FOB key carriers a proper FOB key is defined as a "FOB key identifying step," and the step of enabling relay-attack is defined as a "user authentication step." However, it should be appreciated that the FOB key identifying step and the user authentication step may not be clearly distinct from each other according to an embodiment of the present invention. This is why the response signal transmitting step (S30) is conceptually involved in both the FOB key identifying step and the user authentication step in view of determining whether to transmit the response signal.

Here, as a technical area involved in the FOB key identifying step, a first embodiment of a method for preventing relay-attack on a smart key system according to the present invention is proposed.

The FOB key identifying step related to a method for preventing relay-attack on a smart key system according to a first embodiment of the present invention is described below in greater detail.

The challenge signal receiving step (S10) may further include an encryption code request signal that may be transmitted to the SMK unit as the response signal for the FOB key to perform normal user authentication in addition to the RSSI information having two levels.

Meanwhile, the vehicle may have a first adjusting unit that adjusts the gain of a power amplifier to allow the RSSI to have the two levels as described above in connection with FIG. 4a. The first adjusting unit may be a power driver IC.

The first adjusting unit generates the difference between the two levels of the RSSIs so that the level difference varies each time the door handle triggering occurs. In other words, whenever the door handle triggering occurs, the two pieces of RSSI information are generated to have a random level difference (for example, level differences shown in FIG. 3(a) through (f)), and the RSSI level difference should always contain a set value that is predictable by the FOB key in the decoding step.

Further, the FOB key may have an LFIC supporting a function of identifying the RSSI level difference.

The FOB key stores a set value for comparing the RSSI level differences, and in the response signal transmitting step (S30), the response signal is transmitted to the SMK unit only when the RSSI level difference is consistent with the set value.

Here, the response signal that the FOB key transmits in response to the LF signal (challenge signal) may contain encryption code information according to the encryption code request signal requested to allow the SMK unit to determine a normal user and a received signal strength indication decoded (hereinafter, "DRSSI") by the FOB key, and current voltage level (hereinafter, "VL") of the FOB key.

The encryption code is data that is received by the SMK unit and is compared with an encryption code pre-stored in the SMK unit in order to determine whether the carrier of the FOB key is a normal user.

As such, in the first embodiment of a method for preventing relay-attack on a smart key system according to the present invention, as shown in FIG. 3, the LF signal transmitted from the SMK unit to the FOB key is adapted to contain two pieces of RSSI information with a level difference randomly created and encryption code request signal information (S10), the FOB key receiving the same decodes the RSSI level difference and the encryption code request signal information (S20), and only when the RSSI level difference is consistent with the set value, the response signal is transmitted to the SMK unit. As such, it is determined whether the carrier of the FOB key is a normal carrier of the FOB key regardless of the distance between the carrier and the vehicle prior to the normal user authentication step, previously eliminating any chance of the vehicle and equipment in the vehicle being stolen.

However, it should be appreciated that an embodiment of a method for preventing relay-attack on a smart key system according to the present invention is not limited to the above-described first embodiment.

More specifically, as the FOB key identifying step, a second embodiment of a method for preventing relay-attack on a smart key system according to the present invention is proposed.

The FOB key identifying step according to the second step of a method for preventing relay-attack on a smart key system according to the present invention is described below in greater detail.

Referring to FIG. 4, the SMK unit includes a filter filtering an electrical signal input thereto, an RFIC, an RF antenna receiving an RF signal transmitted from the FOB key, and an LF transmitter transmitting an LF signal to the FOB key. The FOB key includes an LF receiver, an LFIC, an MCU, an RFIC, a filter, a power amplifier, an RF transmitter, and a plurality of switches.

The second embodiment of a method for preventing relay-attack on a smart key system according to the present invention, as described above in connection with FIG. 2, involves the response signal transmitting step (S30) in which after the first decoding step (S20), the FOB key transmits a response signal to the SMK unit in response to the challenge signal. Accordingly, strictly speaking, the second embodiment of a method for preventing relay-attack on a smart key system according to the present invention may be considered to depart from the category of the above-described FOB key identifying step. However, the second embodiment may be indirectly considered a FOB key identifying step in light that, before the FOB key transmits the response signal, as will be described below, the output strength of the response signal may be adjusted to allow the user currently carrying the proper FOB key to be subjected to normal user authentication only when the carrier secures visibility to the vehicle.

More specifically, as shown in FIG. 5, the response signal transmitting/receiving step (S30) includes a signal determining step (S31) for determining whether a signal input to the SMK unit is an LF signal generated by door handle triggering or an RF signal generated by switch manipulation on the FOB key.

A preferred embodiment of a method for preventing relay-attack on a smart key system according to the present invention primarily targets controlling the output strengths to be varied when the FOB key transmits a response signal to the SMK unit in the response signal transmitting step (S30) according to the signal obtained by determination in the signal determining step (S31).

This is why, in case the SMK unit receives the RF signal generated by switch manipulation, it is highly likely for a proper user carrying a proper FOB key to be manipulating the FOB key while securing visibility to the vehicle, whereas in case the signal is an LF signal generated by door handle triggering, it is hard to determine that the carrier of the FOB key is proper. Therefore, in case the LF signal generated by door handle triggering is input to the SMK unit, it is preferable to proceed with the operation of the functional operation units that is to be performed later presuming that the carrier of the FOB key has secured visibility. A main configuration of the present invention is particularly to allow the response signal to reach the SMK unit only within a predetermined distance by further decreasing the output strength of the response signal when the LF signal is input to the SMK unit than when the RS signal generated by switch manipulation is input to the SMK unit.

In the response signal transmitting step (S30), the output strength of the response signal may be controlled by a second adjusting unit that adjusts the gain of the power amplifier provided in the FOB key, as illustrated in FIG. 4b.

An example of controlling the output strength of the response signal according to the type of a signal input to the SMK unit using the second adjusting unit is described below in detail.

First, the second adjusting unit, as illustrated in FIG. 5, adjusts the gain of the power amplifier so that the response signal is output with a set output (hereinafter, "a first output value") in case the input signal is an RF signal generated by switch manipulation and adjusts the gain of the power amplifier so that the response signal is output with a second output value smaller than the first output value in case the input signal is an LF signal generated by door handle triggering.

The first output value corresponding to the set output level is a normal output strength in which the response signal is typically output when the current voltage level of the FOB key maintains an average level. That is, according to the present invention, in case the signal input to the SMK unit is an RF signal generated by switch manipulation, the normal output strength of the response signal is maintained so that even when the distance between the vehicle and the power factor is further increased, the functional operation units may be operated. However, in case the signal input to the SMK unit is an LF signal generated by door handle triggering, the output strength of the response signal is reduced to be lower than that of the signal generated by switch manipulation to thus reduce the range of the response signal, and in return, the carrier of the FOB key may secure more visibility to the vehicle as long as the reduced range.

Here, the response signal transmitting step (S30) further includes a voltage level monitoring step (S33) of monitoring a current voltage level (hereinafter, "VL") of the FOB key.

The current VL obtained in the voltage level monitoring step (S33) is to make up for the range of the response signal that indeed varies depending on the VL.

In other words, according to the present invention, the set output value (first output value) may be set to be inverse-proportional with the VL obtained in the voltage level monitoring step (S33).

More specifically, the second adjusting unit may adjust the gain of the power amplifier so that the response signal is output with a value (1ath output value) larger than the first output value in case the VL is smaller than the set VL and the input signal is an RF signal generated by switch manipulation.

Further, the second adjusting unit may adjust the gain of the power amplifier so that the response signal is output with a value (2ath output value) larger than the second output value in case the VL is smaller than the set VL and the input signal is an LF signal generated by door handle triggering.

Here, the value (2ath output value) larger than the second output value is controlled to be preferably smaller than the first output value. More preferably, the value (the 2ath output value) larger than the second output value may be set to a middle value between the first output value and the second output value.

After undergoing the response signal transmitting step (S20), the SMK unit decodes the input signal (the second decoding step (S40)) and then operates various corresponding functional operation units of the vehicle as per the data request included in the signal.

As such, in the second embodiment of a method for preventing relay-attack on a smart key system according to the present invention, after monitoring the current voltage level (VL) of the FOB key and determining a signal input to the SMK unit, the output strength of the response signal may be efficiently adjusted according to the signal, thus enabling the carrier of the FOB key to at least secure visibility to the vehicle. Accordingly, the vehicle and equipment in the vehicle may be prevented in advance from being stolen.

However, embodiments of the present invention are not necessarily limited to the first embodiment and the second embodiment. In the technical spirit, according to the first embodiment, while the FOB key receives the challenge signal from the SMK unit, the FOB key is identified using the RSSI level difference, and according to the second embodiment, the output strength of the response signal is varied depending on the type of the challenge signal. In the same consideration, the response signal may be used to identify a normal user.

That is, in a third embodiment of a method for preventing relay-attack on a smart key system according to the present invention, as illustrated in FIG. 2, the response signal transmitted from the FOB key in response to the LF signal in the normal user determining step (S50) may have at least two types of information that may include information on received signal strength indication (hereinafter, "RSSI") and current voltage level (hereinafter, "VL") of the FOB key.

The response signal may further include an encryption code transmitted from the FOB key for normal user authentication in the normal user determining step (S50) as well as the RSSI and VL.

The encryption code is data that is received by the SMK unit and is compared with an encryption code pre-stored in the SMK unit in order to determine whether the carrier of the FOB key is a normal user.

Meanwhile, the VL includes two types of information when the VL is the set voltage level or more and when the VL is smaller than the set voltage, and the RSSI includes two types of information when the RSSI is a set strength or more and when the RSSI is smaller than the set strength. Accordingly, the VL and RSSI information apply to calculation of the current distance between the vehicle and the FOB key in the normal user determining step.

More specifically, when the RSSI is the set strength or more, the current distance between the vehicle and the FOB key is considered to be short, thus determining that it is a passive operation signal by a normal user, and when the RSSI is smaller than the set strength, the current distance between the vehicle and the FOB key is considered to be long, thus determining that it is a passive operation signal by an abnormal user.

However, even when the RSSIs are the same, the current distance calculated may differ from the actual distance. For example, as illustrated in FIG. 7, in case the VL is the set voltage or more (here, the set voltage is assumed to be 3V), if the RSSI is a set strength or more, the current distance may be considered to be short, while if the RSSI is smaller than the set strength, the current distance may be considered to be long even when the VL is not less than the set voltage. In contrast, even when the VL is less than the set voltage, if the RSSI is not less than the set strength, the current distance may be considered to be short while even when the VL is not less than the set voltage, if the RSSI is less than the set strength, the current distance may be considered to be long.

According to the present invention, in order to more precisely calculate the current distance from the response signal transmitted in response to the LF signal from the FOB key, the RSSI and VL information is divided for each of the case where the RSSI and VL are not less than the set strength and set voltage and the case where the RSSI and VL are less than the set strength and set voltage.

Here, the set strength of the RSSI when the VL is not less than the set voltage (hereinafter, "first set strength") differs from the set strength of the RSSI when the VL is less than the set voltage (hereinafter, "second set strength").

Preferably, the first set strength may be set to be larger than the second set strength. This is why as compared with when the VL is less than the set voltage, when the VL is not less than the set voltage, at least the RSSI having the first set strength larger than the second set strength may render the current distance between the vehicle and the FOB key to be determined to be short. In contrast, in case the VL is less than the set voltage, as compared with when the VL is not less than the set voltage, the RSSI having the second set strength smaller than the first set strength may render the current distance between the vehicle and the FOB key to be determined to be short. Accordingly, the FOB key may be prevented from malfunctioning due to being out of battery.

The set voltage is linearly varied with respect to the RSSI, and the first set strength and the second set strength are stored in the SMK unit to have map data as variables that change in proportion with the set voltage.

Accordingly, the current distance between the vehicle and the FOB key calculated in the normal user determining step (S50) is calculated as being short when the RSSI is not less than the first set strength or the second set strength and as being long when the RSSI is less than the first set strength or the second set strength as illustrated in FIG. 8. In the normal user determining step (S30), only when the current distance is calculated as being short, the passive operation signal is determined to be normal, and when the current distance is calculated as being long, the passive operation signal is determined to be abnormal.

As such, in embodiments of a method for preventing relay-attack on a smart key system according to the present invention, whether there is a proper carrier of the FOB key is determined through the FOB key identifying step based on the challenge signal received from the SMK unit before the FOB key responds to the SMK unit with a response signal to prevent an impure carrier of a copied FOB key from approaching the vehicle. Further, the response signal contains predetermined information so that relay-attack may be possible only when the carrier of the FOB key may secure visibility within the actual distance between the vehicle and the FOB key. Accordingly, the probability of the vehicle and equipment in the vehicle being stolen may be significantly reduced.

A process of applying a method for preventing relay-attack on a smart key system as configured above is now described.

In the process of applying a method for preventing relay-attack on a smart key system according to the first embodiment of the present invention, first, if door handle triggering occurs by a carrier of a FOB key or a third party not carrying the FOB key as illustrated in FIG. 2, the SMK unit in the vehicle generates an LF signal, modulates/demodulates the generated LF signal, and transmits the resultant signal to the FOB key (S10).

In this case, the LF signal is a challenge signal containing RSSI information of two levels and encryption code request signal information.

The FOB key decodes a difference in level of the RSSIs of the challenge signal (S20), and only when the decoded RSSI level difference is consistent with a set value, the FOB key transmits a response signal to the SMK unit in response to the challenge signal (S30).

Accordingly, in the first embodiment of a method for preventing relay-attack on a smart key system according to the present invention, it is previously determined that the carrier is not a normal carrier of the FOB key before the response signal is received by the SMK unit, so that the transmission of the response signal may be prevented. Accordingly, relay-attack based on the information on the carrier of an abnormal FOB key may be prevented regardless of the distance between the vehicle and the FOB key.

In a process of applying a method for preventing relay-attack on a smart key system according to the second embodiment of the present invention, as shown in FIG. 5, if the carrier of the FOB key manipulates a switch on the FOB key or the carrier of the FOB key or anyone else triggers a side door handle (door handle triggering), the SMK unit transmits a challenge signal to the FOB key, and the FOB key receives the challenge signal (challenge signal receiving step (S10)).

Next, when receiving the challenge signal, the FOB key decodes a difference in level of the RSSIs contained in the received challenge signal (first decoding step (S20)), transmits a response signal to the SMK unit in response to the challenge signal, and the SMK unit receives the response signal (response signal transmitting step (S30)).

Here, the response signal transmitting step (S30) further includes a signal determining step (S31) of determining whether the input signal is an LF signal signal generated by the door handle triggering or an RF signal generated by switch manipulation and a voltage level monitoring step (S33) of steadily monitoring the current voltage level (VL) of the FOB key.

Once the input signal is an RF signal generated by switch manipulation of the FOB key, the FOB key performs control using the second adjusting unit so that the output value of the response signal is a set output value (first output value).

However, in case the input signal is an LF signal generated by door handle triggering, the FOB key performs control using the second adjusting unit so that the output value of the response signal is the second output value lower than the first output value.

Meanwhile, even in case the input signal is an response signal generated by switch manipulation of the FOB key, if it is determined in the voltage level monitoring step (S33) that the current voltage level (VL) of the FOB key is less than the set VL, the FOB key may perform control using the second adjusting unit so that the output value of the response signal is an output level (1ath output value) higher than the first output value.

Further, even in case the input signal is an LF signal generated by door handle triggering, if it is determined in the voltage level monitoring step (S33) that the current voltage level (VL) of the FOB key is less than the set VL, the FOB key may perform control using the second adjusting unit so that the output value of the response signal is an output value (2ath output value) higher than the second output value.

Here, the 1ath output value is preferably set to higher than the first output value, and the 2ath output value is preferably set to be lower than the first output value. More specifically, the 2ath output value may be a middle value between the first output value and the second output value.

If the response signal is transmitted at each controlled output strength from the FOB key and is received by the SMK unit, the received information is decoded (second decoding step (S40), and the SMK unit determines whether the carrier is a normal user (S50) and then operates various functional operation units corresponding to the signal (S60).

As such, in a method for preventing relay-attack on a smart key system according to the present invention, rather than the response signal from the FOB key being subjected to unconditional relay-attack on the SMK unit, the output strength of the response signal is adjusted depending on the current voltage level (VL) of the FOB key and the type of the signal input to the SMK unit, so that the relay-attack is avoided upon a failure to secure a visibility range within which the carrier of the FOB key may observe the vehicle. Accordingly, the vehicle and equipment in the vehicle may be prevented from being stolen.

Finally, in a process of applying a method for preventing relay-attack on a smart key system according to a third embodiment of the present invention, as shown in FIG. 2, if door handle triggering occurs by a carrier of a FOB key or a third party not carrying the FOB key, the SMK unit in the vehicle generates an LF signal, modulates/demodulates the generated LF signal, and transmits the resultant signal to the FOB key.

When receiving the LF signal, the FOB key transmits a response signal to the SMK unit in response to the LF signal. When receiving the response signal, the SMK unit decodes the information contained in the response signal, compares the received encryption code data with a previously stored encryption code, and only when they are consistent with each other, the SMK unit unlocks the side door.

In the third embodiment, regardless of adjusting the output strength of the response signal as in the second embodiment, a batter level (VL) indicating that the RSSI and current remaining battery time is included in the response signal, thus allowing for exact calculation of the current distance between the vehicle and the FOB key. Accordingly, relay-attack may be prevented when the carrier of the FOB key departs from the actual visibility range of the vehicle. Here, the same method described above in connection with the second embodiment may apply to calculation of the current distance between the vehicle and the FOB key.

Various embodiments of a method for preventing relay-attack on a smart key system have been described above with reference to the accompanying drawings. However, embodiments of the present invention are not limited to the above-described embodiments, and it is apparent to one of ordinary skill in the art that various changes may be made thereto without departing from the claims and equivalents thereof. For example, although in the above embodiments methods for preventing relay-attack on a smart key system have been exemplified for normal user authentication regarding a passive entry operation signal among various functional operation units of the vehicle, it is apparent to one of ordinary skill in the art that the scope of the present invention may also apply to whatever is associated with relay-attack on the smart key system involved in the operation of various functional operation units provided in the vehicle, such as passive start and opening/closing the trunk door, as well as the passive entry. Thus, the scope of the present invention should be defined by the appended claims.

Preferred embodiments of methods for preventing relay-attack on a smart key system have been described above with reference to the drawings. However, embodiments of the present invention are not limited to the above-described embodiments, and it is apparent to one of ordinary skill in the art that various changes may be made thereto without departing from the claims and equivalents thereof. For example, although in the above embodiments methods for preventing relay-attack on a smart key system have been exemplified for normal user authentication regarding a passive entry operation signal among various functional operation units of the vehicle, it is apparent to one of ordinary skill in the art that the scope of the present invention may also apply to whatever is associated with relay-attack on the smart key system involved in the operation of various functional operation units provided in the vehicle, such as passive start and opening/closing the trunk door, as well as the passive entry. Thus, the scope of the present invention should be defined by the appended claims.

The invention claimed is:

1. A method for preventing relay-attack on a smart key system, the method comprising:
   a challenge signal receiving step of transmitting a challenge signal including received signal strength information (hereinafter, "RSSI") information of two levels from a smart key unit (hereinafter, "SMK unit") installed in a vehicle to a FOB key carried by a user and receiving the challenge signal by the FOB key;
   a first decoding step of decoding at least one information item of information items included in the challenge signal after receiving the challenge signal;
   a response signal transmitting step of transmitting a response signal from the FOB key to the SMK unit after the first decoding step;
   a second decoding step of decoding at least any one information item included in the response signal received by the SMK unit after the response signal transmitting step; and
   a normal user determining step of calculating a current distance between the vehicle and the FOB key using a result interpreted in the second decoding step and determining whether a passive operation signal applied from a door of the vehicle other than the FOB key is normal.

2. The method of claim 1, wherein the response signal transmitting step is a step of the FOB key transmitting transmitting the response signal to the SMK unit in response to the challenge signal only when an RSSI level difference interpreted in the first decoding step is consistent with a set value.

3. The method of claim 1, wherein the vehicle includes a first adjusting unit adjusting a gain of a power amplifier so that the RSSI has two levels.

4. The method of claim 3, wherein the first adjusting unit randomly generates the RSSI level difference.

5. The method of claim 1, wherein the FOB key includes an LFIC identifying the RSSI level difference.

6. The method of claim 1, wherein the challenge signal received by the FOB key in the challenge signal receiving step further includes an encryption code request signal that allows the FOB key to transmit the response signal including an encryption code for normal user authentication.

* * * * *